US012749887B2

(12) United States Patent
Nakagami et al.

(10) Patent No.: US 12,749,887 B2
(45) Date of Patent: Sep. 29, 2026

(54) SHORT-CIRCUIT PROTECTION CIRCUIT, SEMICONDUCTOR DEVICE, AND SHORT-CIRCUIT PROTECTION METHOD

(71) Applicant: MITSUBISHI HEAVY INDUSTRIES, LTD., Tokyo (JP)

(72) Inventors: Takashi Nakagami, Tokyo (JP); Yusuke Yoshino, Tokyo (JP); Ryo Iida, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 105 days.

(21) Appl. No.: 18/995,493

(22) PCT Filed: Feb. 17, 2023

(86) PCT No.: PCT/JP2023/005830
§ 371 (c)(1),
(2) Date: Jan. 16, 2025

(87) PCT Pub. No.: WO2024/024138
PCT Pub. Date: Feb. 1, 2024

(65) Prior Publication Data

US 2026/0018878 A1 Jan. 15, 2026

(30) Foreign Application Priority Data

Jul. 28, 2022 (JP) ................................ 2022-120141

(51) Int. Cl.
*H02H 3/16* (2006.01)
*H02H 1/00* (2006.01)

(52) U.S. Cl.
CPC ............ *H02H 3/16* (2013.01); *H02H 1/0007* (2013.01)

(58) Field of Classification Search
CPC ........ H02H 1/0007; H02H 3/093; H02H 3/16; H03K 17/0822; H03K 2217/0027
(Continued)

(56) References Cited

U.S. PATENT DOCUMENTS

2019/0386654 A1* 12/2019 Norling ........... H03K 17/08128

FOREIGN PATENT DOCUMENTS

CN 113659827 A * 11/2021 ............. H02M 1/44
JP H07297695 A 11/1995
(Continued)

OTHER PUBLICATIONS

Machine translation of Wang et al. Chinese Patent Document CN 113659827 A Nov. 2021 (Year: 2021).*
(Continued)

*Primary Examiner* — Kevin J Comber
(74) *Attorney, Agent, or Firm* — Osha Bergman Watanabe & Burton LLP

(57) ABSTRACT

A short-circuit protection circuit including: a voltage dividing circuit that divides a power supply voltage supplied from a power supply connected to one end thereof; a semiconductor rectifying element, one end of which is connected between resistance elements of the voltage dividing circuit and the other end of which is connected onto a path of a conductive wire connected to a current-inflow-side terminal of a protected semiconductor switch element, the connection being made such that a direction from the one end to the other end becomes a rectifying direction; an RC parallel circuit connected to the other end of the voltage dividing circuit; and a drive unit that turns off the semiconductor switch element when it is detected that a short-circuit current flows through the conductive wire, on the basis of a voltage of a capacitor element of the RC parallel circuit, when the semiconductor switch element is turned on.

6 Claims, 10 Drawing Sheets

(58) Field of Classification Search
USPC .......................................................... 361/101
See application file for complete search history.

(56) References Cited

FOREIGN PATENT DOCUMENTS

| | | | | | |
|---|---|---|---|---|---|
| JP | 2001015750 | A | * | 1/2001 | |
| JP | 2020136875 | A | * | 8/2020 | |
| JP | 2021103849 | A | * | 7/2021 | ........... H03K 17/567 |

OTHER PUBLICATIONS

Machine translation of Kumagai et al. Japanese Patent Document JP 2001-15750 A Jan. 2001 (Year: 2001).*
Machine translation of Kawamura Japanese Patent Document JP 2020-136875 A Aug. 2020 (Year: 2020).*
Machine translation of Ogawa Japanese Patent Document JP 2021-103849 A Jul. 2021 (Year: 2021).*
Rohm, "SiC Power Devices and Modules Application Note" Rev. 003, <https://fscdn.rohm.com/jp/products/databook/applinote/discrete/sic/common/sic_appli-j.pdf,> Nov. 2020 (174 pages with English Translation).
International Search Report issued in corresponding PCT Application No. PCT/JP2023/005830, dated May 9, 2023 (4 Pages with English Translation).
Written Opinion of the International Searching Authority issued in corresponding PCT Application PCT/JP2023/005830, dated May 9, 2023 (6 Pages with English Translation).

* cited by examiner

SHORT-CIRCUIT PROTECTION CIRCUIT, SEMICONDUCTOR DEVICE, AND SHORT-CIRCUIT PROTECTION METHOD

TECHNICAL FIELD

The present disclosure relates to a short-circuit protection circuit, a semiconductor device, and a short-circuit protection method. Priority is claimed on Japanese Patent Application No. 2022-120141, filed Jul. 28, 2022, the content of which is incorporated herein by reference.

BACKGROUND ART

Patent Document 1 discloses a protection circuit that detects an overcurrent in an insulated gate bipolar transistor (IGBT), which is a power semiconductor, using a detection resistor (an overcurrent detection resistor 7 in FIG. 1 of Patent Document 1) to protect the power semiconductor from an overcurrent. However, even if the protection circuit is used to protect against a short-circuit current having a large current value, there is a problem in that the detection resistor cannot withstand a short-circuit current having a large current value. For this reason, for example, the protection circuit disclosed in Patent Document 1 cannot be used for short-circuit protection of a high-output power converter or the like.

In response to this, as a short-circuit protection circuit that can perform short-circuit protection even when a short-circuit current with a large current value occurs, for example, a short-circuit protection circuit of a desaturation fault detection (DESAT) type shown in FIGS. 5 to 11(*b*) on page 42 of Non-Patent Document 1 is generally used.

CITATION LIST

Patent Document

Patent Document 1: Japanese Unexamined Patent Application, First Publication No. H07-297695

Non Patent Document

Non Patent Document 1: "SiC Power Device Module Application Note Rev. 003," [Online], August 2020, ROHM Co., Ltd., [Retrieved Jun. 24, 2022], Internet <https://fscdn.rohm.com/jp/products/databook/applinote/discrete/sic/common/sic_appli-j.pdf>

SUMMARY OF INVENTION

Technical Problem

FIG. 9 is a circuit diagram showing a short-circuit protection circuit of a general DESAT type. FIG. 9 shows a metal-oxide-semiconductor field-effect transistor (MOSFET) of an N-channel enhancement type as an example of a semiconductor switch element 101 to be protected. For example, in a case in which a circuit element such as another semiconductor switch element (not shown) connected to a conductive wire 108 is in a faulty state, when the semiconductor switch element 101 is turned on, a short-circuit current ID having a large current value will flow through the conductive wire 108.

FIG. 10 shows a graph 201 showing a change in the short-circuit current ID in a transient state when the short-circuit current ID starts to flow through the conductive wire

108, a graph 202 showing a change in a drain-source voltage Vds (hereinafter referred to as a DS voltage Vds) of the semiconductor switch element 101, and a graph 203 showing a change in a DESAT voltage VDESAT, which is a voltage at a DESAT terminal 111 of a drive unit 107 (a gate drive circuit incorporating a short-circuit protection circuit of a DESAT type). In FIG. 10, the horizontal axis is a time axis showing elapsed time, and the unit is [μsec]. In a case in which the graph 201 is an object, the vertical axis on the left side is an axis showing the magnitude of a current, and in this case, the unit is "A." In addition, in a case in which the graph 202 is an object, the vertical axis on the left side is an axis showing the magnitude of a voltage, and in this case, the unit is "V." The vertical axis on the right side is an axis showing the magnitude of a voltage for the graph 203, and the unit is [V].

When the semiconductor switch element 101 is turned on and the short-circuit current ID starts to flow through the conductive wire 108, the short-circuit current ID starts to increase as shown in the graph 201. When the short-circuit current ID starts to increase, a voltage drop of L·dID/dt occurs due to a parasitic inductance component L present in the conductive wire 108. For this reason, the DS voltage Vds decreases in the section indicated by a reference sign 211 as shown in the graph 202. Due to this decrease in the DS voltage Vds, the DESAT voltage VDESAT decreases in the section indicated by a reference sign 212 as shown in the graph 203. Thereafter, when a charge is accumulated in a blanking capacitor 105 (a capacitor element) that is an external component of a DESAT circuit with a current supplied from a power supply 109 via resistors 102 and 103, the DESAT voltage VDESAT increases. When the voltage detected at the DESAT terminal 111 reaches a threshold level indicated by a dashed line with a reference sign 213, the drive unit 107 turns off the semiconductor switch element 101. As a result, as shown in the graph 201, the short-circuit current ID decreases to 0 [A], and it is possible to protect the semiconductor switch element 101 from the short-circuit current ID.

The phenomenon in which the DESAT voltage VDESAT decreases due to a decrease in the DS voltage Vds is a phenomenon that is seen, for example, in a case in which the electrostatic capacitance of the blanking capacitor 105 is reduced to correspond to high-speed switching, or the like in a case in which a high-speed switching power semiconductor made of silicon carbide (SiC) is applied as the semiconductor switch element 101. The change in the DESAT voltage VDESAT assumed in the design for short circuit protection of the DESAT type is a change in which the DESAT voltage VDESAT does not decrease even if the short-circuit current ID flows, as shown in the graph 204 indicated by a dotted line in FIG. 10. In a case in which the DESAT voltage VDESAT does not decrease, as shown in the graph 204, the time it takes for the DESAT voltage VDESAT to reach the threshold value also becomes shorter. The time difference until the DESAT voltage VDESAT reaches the threshold value in a case in which the change shown in the graph 203 occurs and in a case in which the change shown in the graph 204 occurs is about several tens of nanoseconds, as indicated by a reference sign 214.

However, due to this time difference of about several tens of nanoseconds, the drive unit 107 is unable to start short-circuit protection at the timing when it should be able to start short-circuit protection, and this causes a problem in that the time during which the short-circuit current ID flows through the semiconductor switch element 101 is also increased. In order to solve this problem, for example, a countermeasure of parallelizing the semiconductor switch elements 101 may be adopted. However, adopting this countermeasure increases the number of semiconductor switch elements 101, resulting in higher costs, and furthermore, increases the area of the substrate and reduces the output, resulting in a decrease in output density.

The present disclosure has been made to solve the above-mentioned problems, and an object of the present disclosure is to provide a short-circuit protection circuit, a semiconductor device, and a short-circuit protection method that can protect a semiconductor switch element from a short-circuit current at an appropriate timing without increasing the number of semiconductor switch elements.

Solution to Problem

In order to solve the above problems, according to the present disclosure, there is provided a short-circuit protection circuit including: a voltage dividing circuit that divides a power supply voltage supplied from a power supply connected to one end thereof; a semiconductor rectifying element, one end of which is connected between resistance elements of the voltage dividing circuit and the other end of which is connected onto a path of a conductive wire connected to a current-inflow-side terminal of a semiconductor switch element to be protected, the connection being made such that a direction from the one end to the other end becomes a rectifying direction; an RC parallel circuit connected to the other end of the voltage dividing circuit; and a drive unit that turns off the semiconductor switch element when it is detected that a short-circuit current flows through the conductive wire, on the basis of a voltage of a capacitor element included in the RC parallel circuit, in a case in which the semiconductor switch element is turned on, wherein a stray capacitance of the semiconductor rectifying element is a stray capacitance that satisfies a condition that a voltage at one end of the capacitor element of the RC parallel circuit, which is connected to the voltage dividing circuit, is higher than a voltage at the other end of the capacitor element, when the short-circuit current flows through the conductive wire.

According to the present disclosure, there is provided a semiconductor device including: a semiconductor switch element; a voltage dividing circuit that divides a power supply voltage supplied from a power supply connected to one end thereof; a semiconductor rectifying element, one end of which is connected between resistance elements of the voltage dividing circuit and the other end of which is connected onto a path of a conductive wire connected to a current-inflow-side terminal of the semiconductor switch element, the connection being made such that a direction from the one end to the other end becomes a rectifying direction; an RC parallel circuit connected to the other end of the voltage dividing circuit; and a drive unit that turns off the semiconductor switch element when it is detected that a short-circuit current flows through the conductive wire, on the basis of a voltage of a capacitor element included in the RC parallel circuit, in a case in which the semiconductor switch element is turned on, wherein a stray capacitance of the semiconductor rectifying element is a stray capacitance that satisfies a condition that a voltage at one end of the capacitor element of the RC parallel circuit, which is connected to the voltage dividing circuit, is higher than a voltage at the other end of the capacitor element, when the short-circuit current flows through the conductive wire.

According to the present disclosure, there is provided a short-circuit protection method, wherein a voltage dividing circuit divides a power supply voltage supplied from a power supply connected to one end thereof, wherein a capacitor element included in an RC parallel circuit connected to the other end of the voltage dividing circuit is charged on the basis of a current supplied, wherein, a semiconductor rectifying element in which a direction from one end to the other end becomes a rectifying direction, and in which the one end is connected between resistance elements of the voltage dividing circuit and the other end is connected onto a path of a conductive wire connected to a current-inflow-side terminal of a semiconductor switch element to be protected and which has a stray capacitance that satisfies a condition that a voltage at one end of the capacitor element of the RC parallel circuit, which is connected to the voltage dividing circuit, is higher than a voltage at the other end of the capacitor element, when a short-circuit current flows through the conductive wire, conducts a current in the rectifying direction in a case in which a voltage at the one end thereof is higher than a voltage at the other end thereof, and wherein a drive unit turns off the semiconductor switch element when it is detected that the short-circuit current flows through the conductive wire, on the basis of a voltage of the capacitor element included in the RC parallel circuit, in a case in which the semiconductor switch element is turned on.

Advantageous Effects of Invention

According to a short-circuit protection circuit, a semiconductor device, and a short-circuit protection method of the present disclosure, it is possible to protect a semiconductor switch element from a short-circuit current at an appropriate timing without increasing the number of semiconductor switch elements.

DESCRIPTION OF EMBODIMENTS (Configuration Example of Semiconductor Device)

Figure 1:
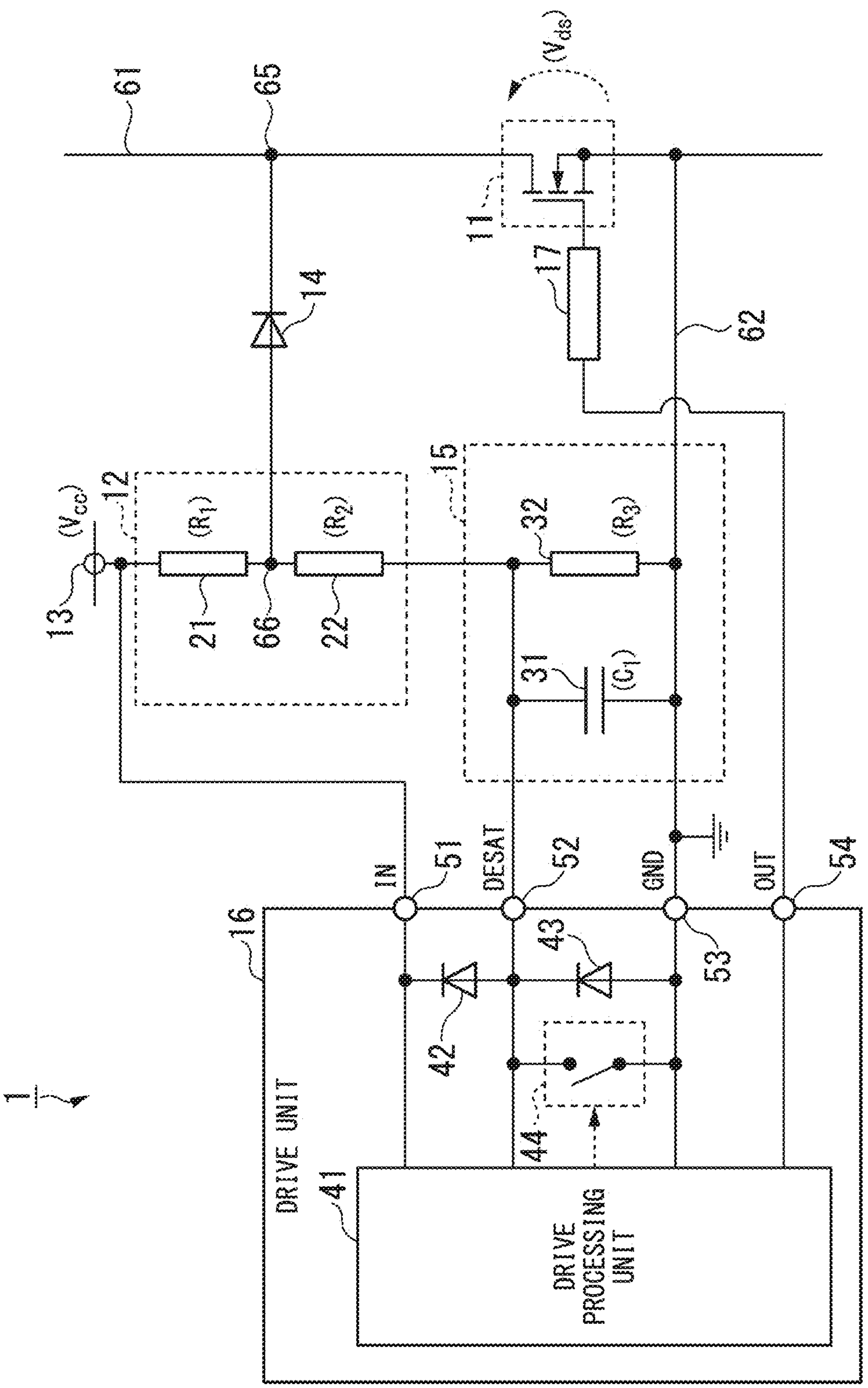
FIG. 1 A circuit diagram showing a configuration example of a semiconductor device according to an embodiment of the present disclosure.
Figure 2:
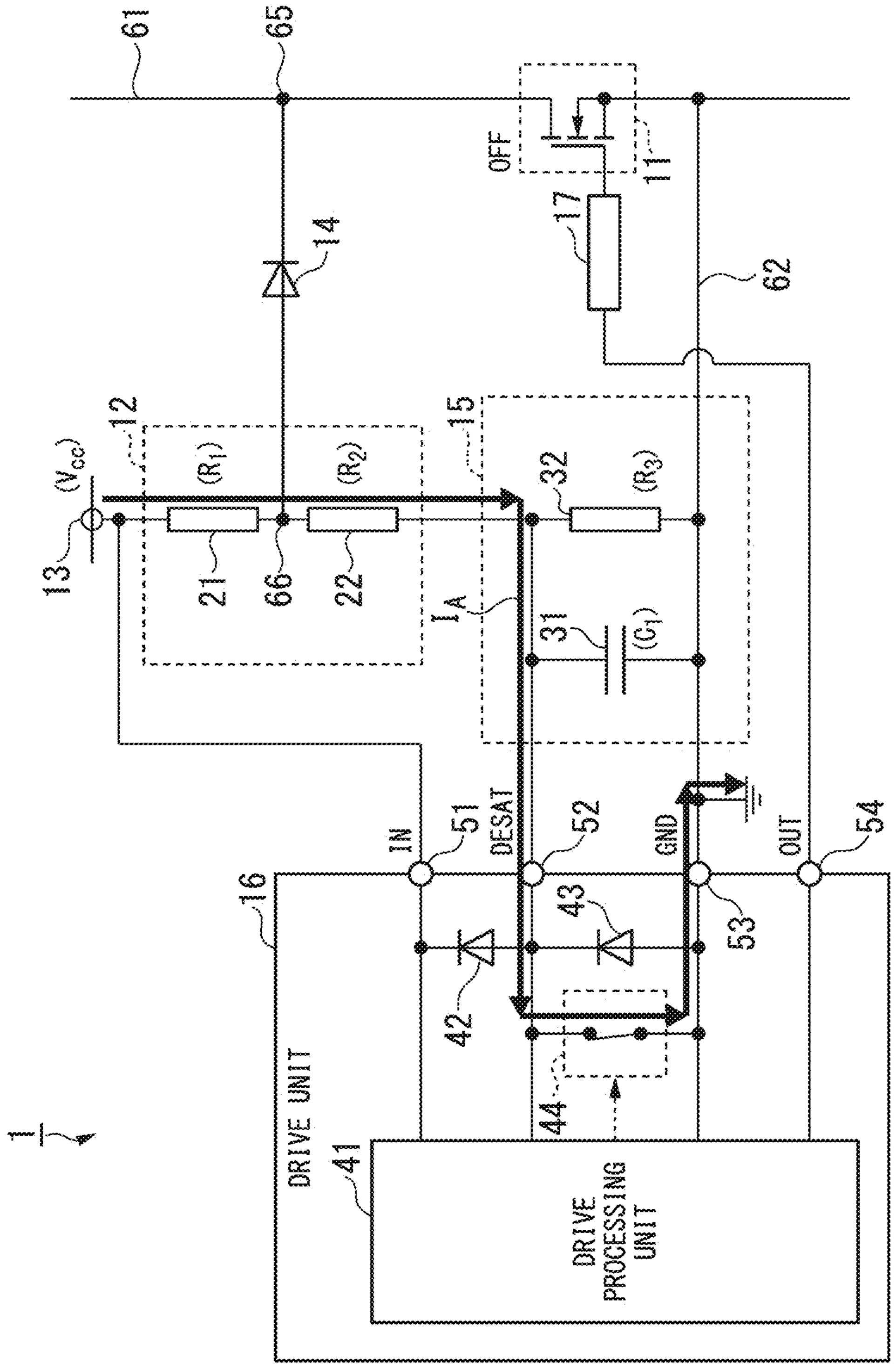
FIG. 2 A diagram (part 1) showing an operation example of the semiconductor device according to the embodiment of the present disclosure in a normal state.
Figure 3:
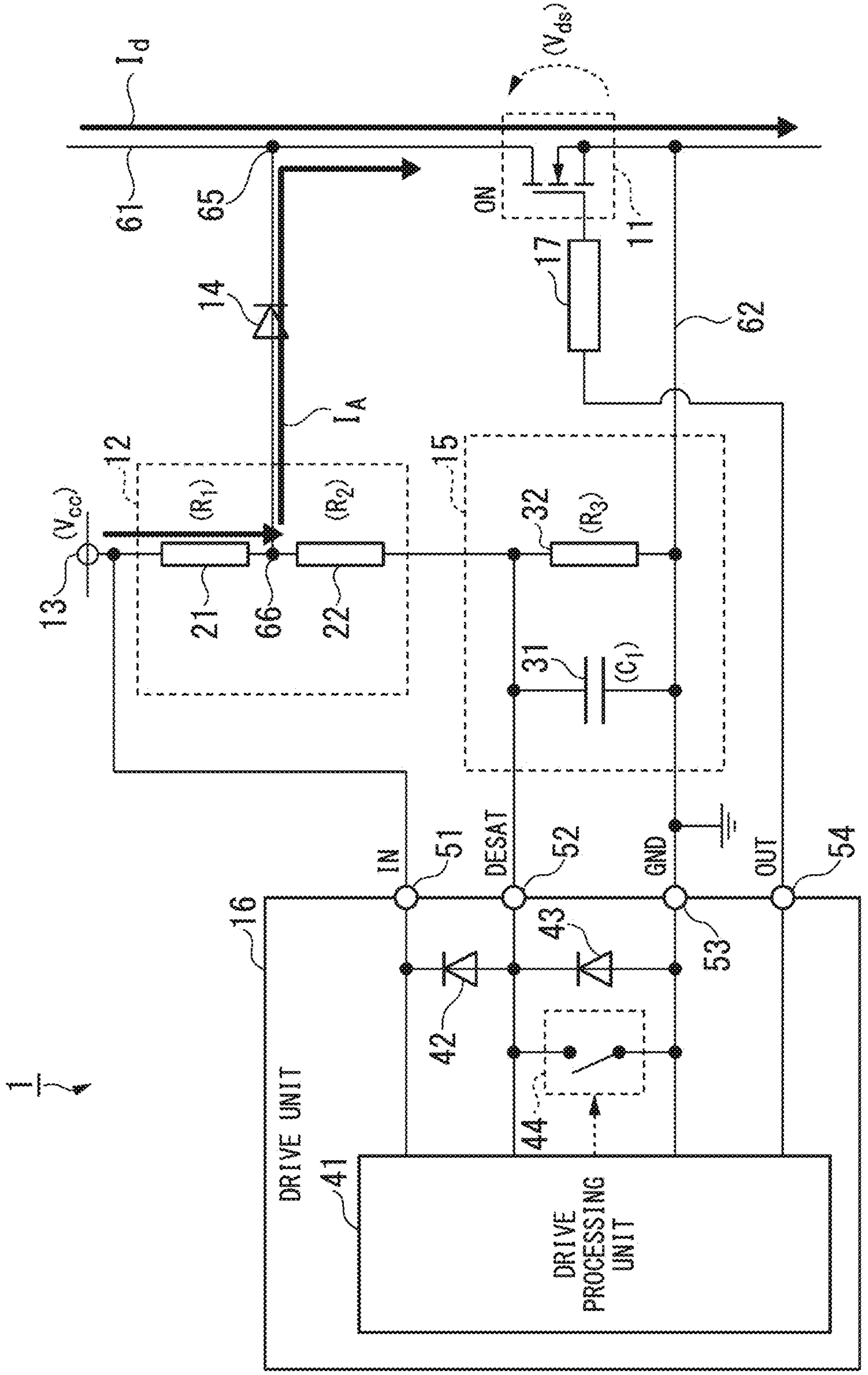
FIG. 3 A diagram (part 2) showing an operation example of the semiconductor device according to the embodiment of the present disclosure in a normal state.
Figure 4:
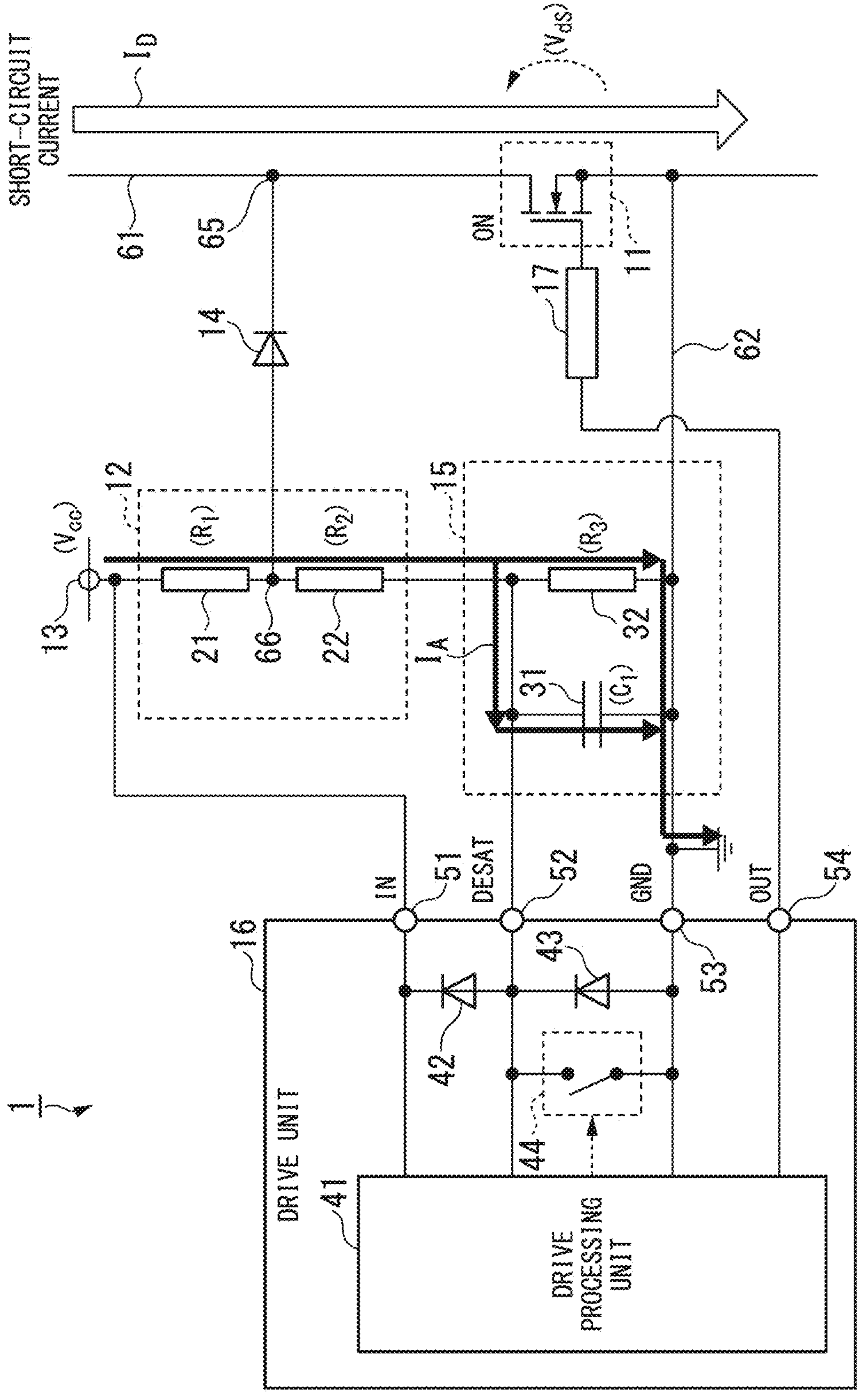
FIG. 4 A diagram showing an operation example of the semiconductor device according to the embodiment of the present disclosure in a case in which a short-circuit current flows.
Figure 5:
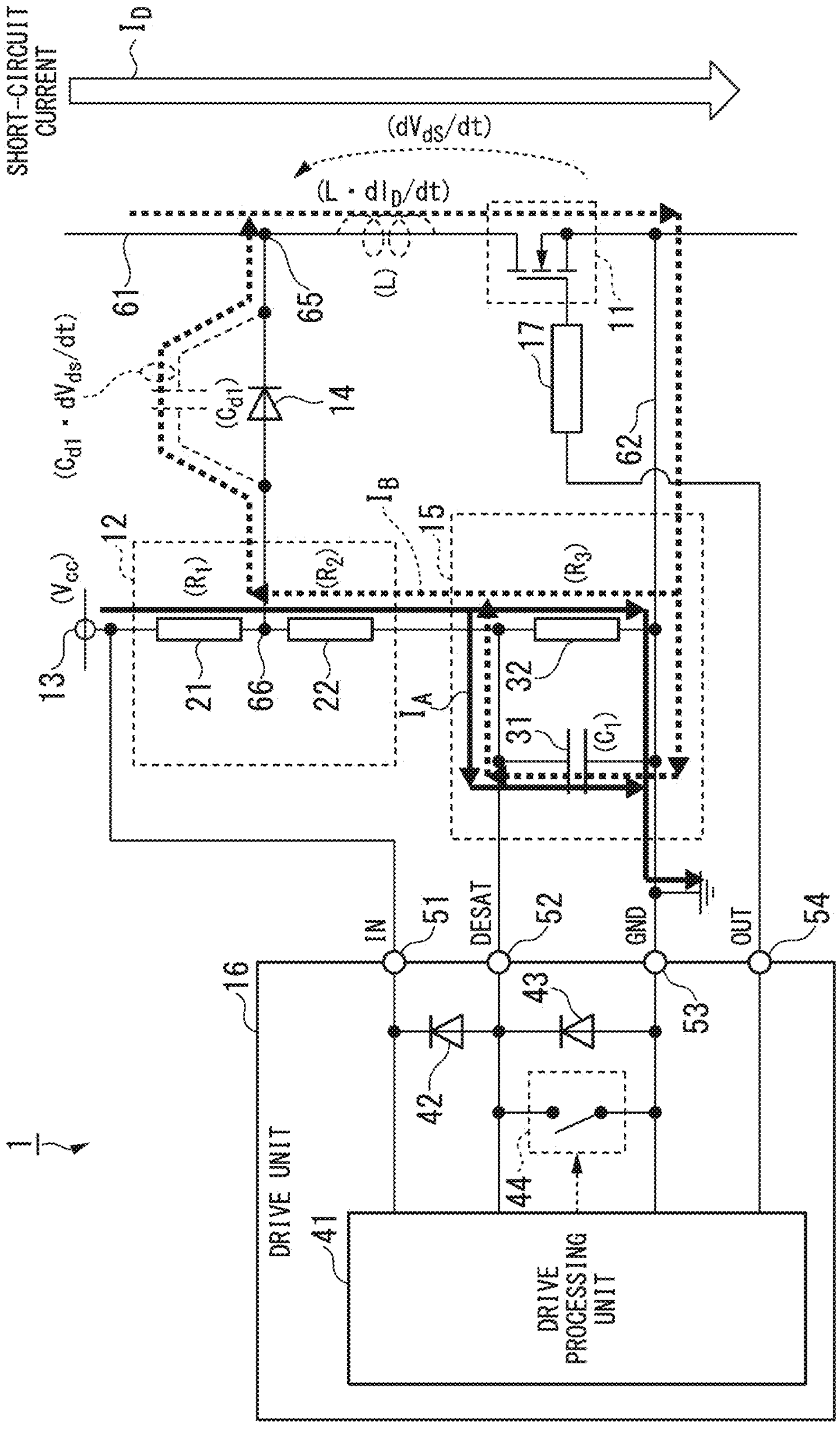
FIG. 5 A diagram showing an operation example of the semiconductor device according to the embodiment of the present disclosure in a transitional period in a case in which a short-circuit current flows.
Figure 6:
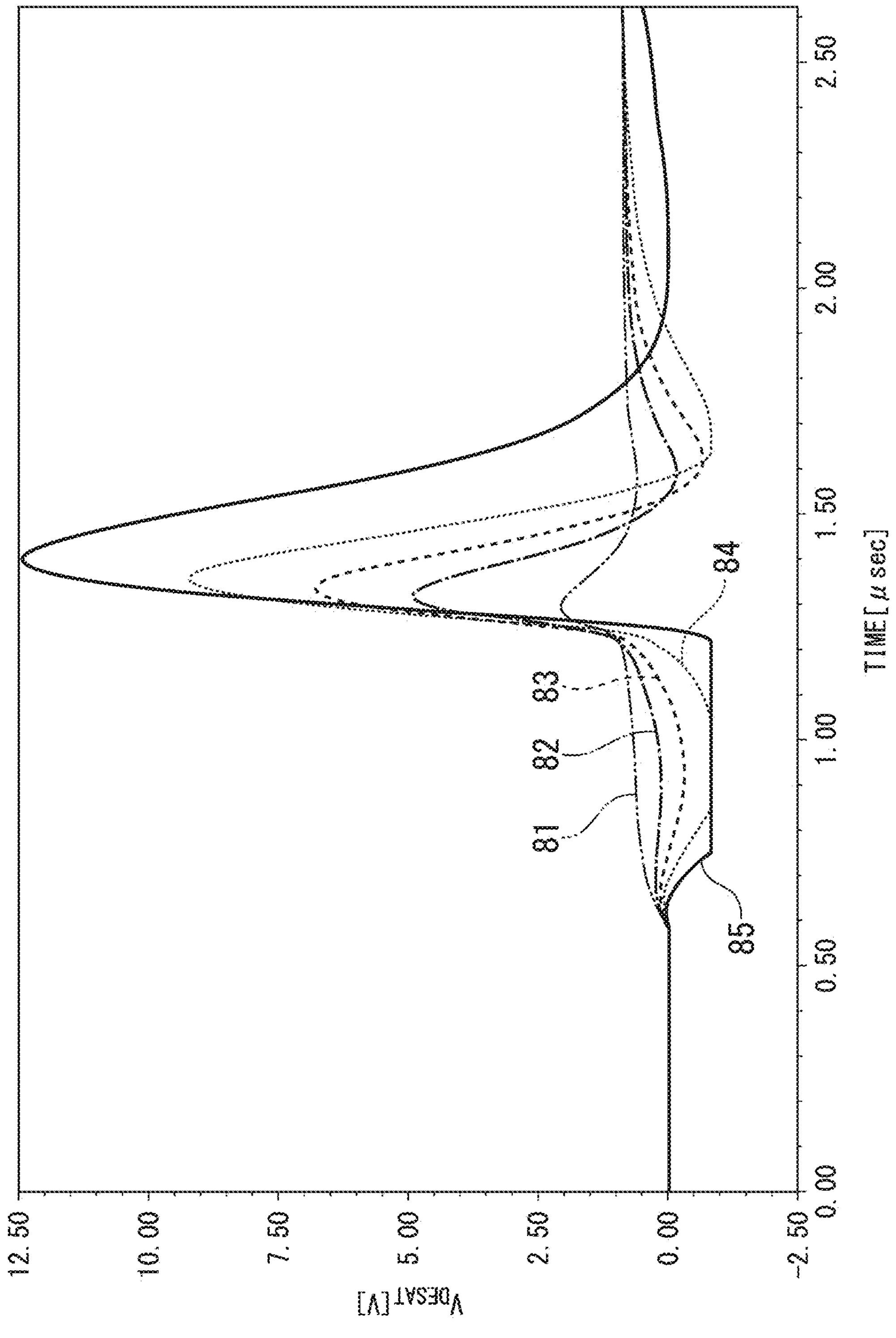
FIG. 6 A diagram showing a change in a DESAT voltage for different stray capacitances calculated by computer simulation according to an embodiment of the present disclosure.
Figure 7:
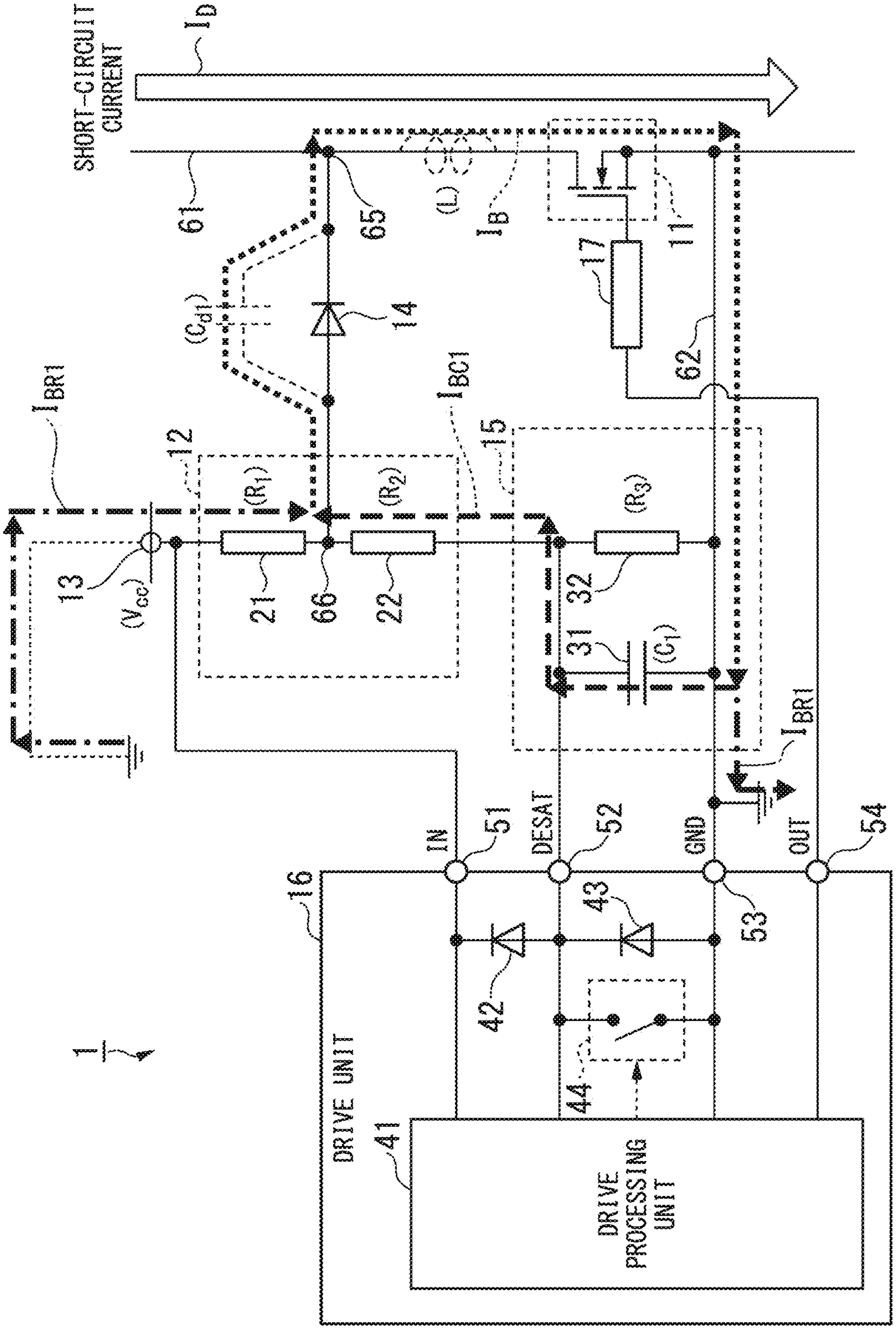
FIG. 7 A diagram showing a path of a current caused by a capacitor element in a transitional period of the semiconductor device according to the embodiment of the present disclosure in a case in which a short-circuit current flows.
Figure 8:
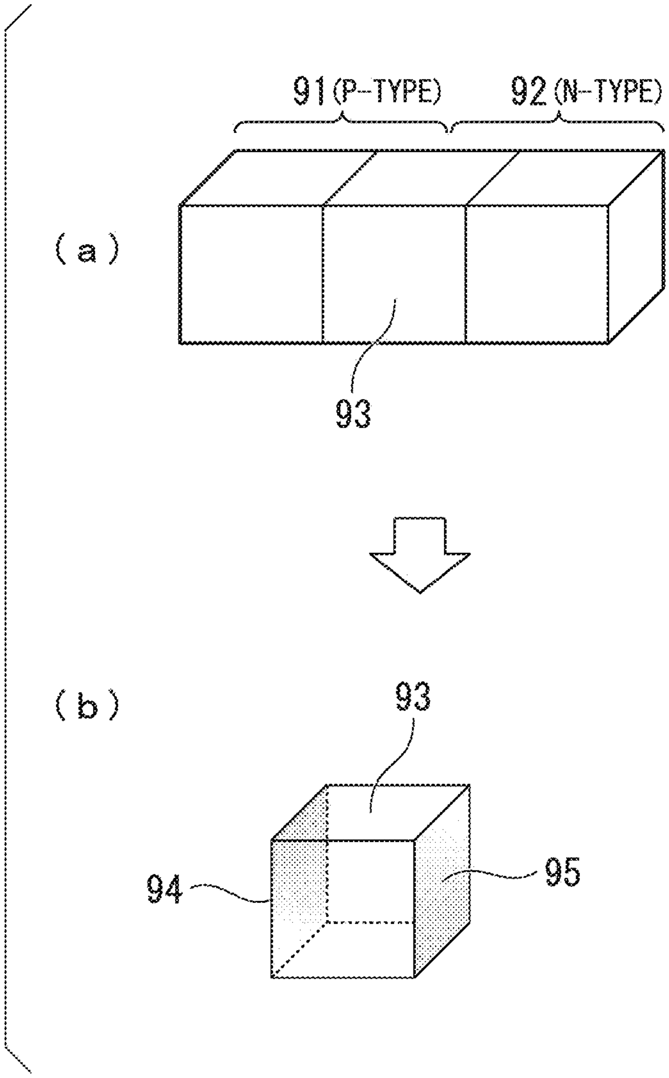
FIG. 8 A diagram illustrating a stray capacitance in a typical semiconductor diode.
Figure 9:
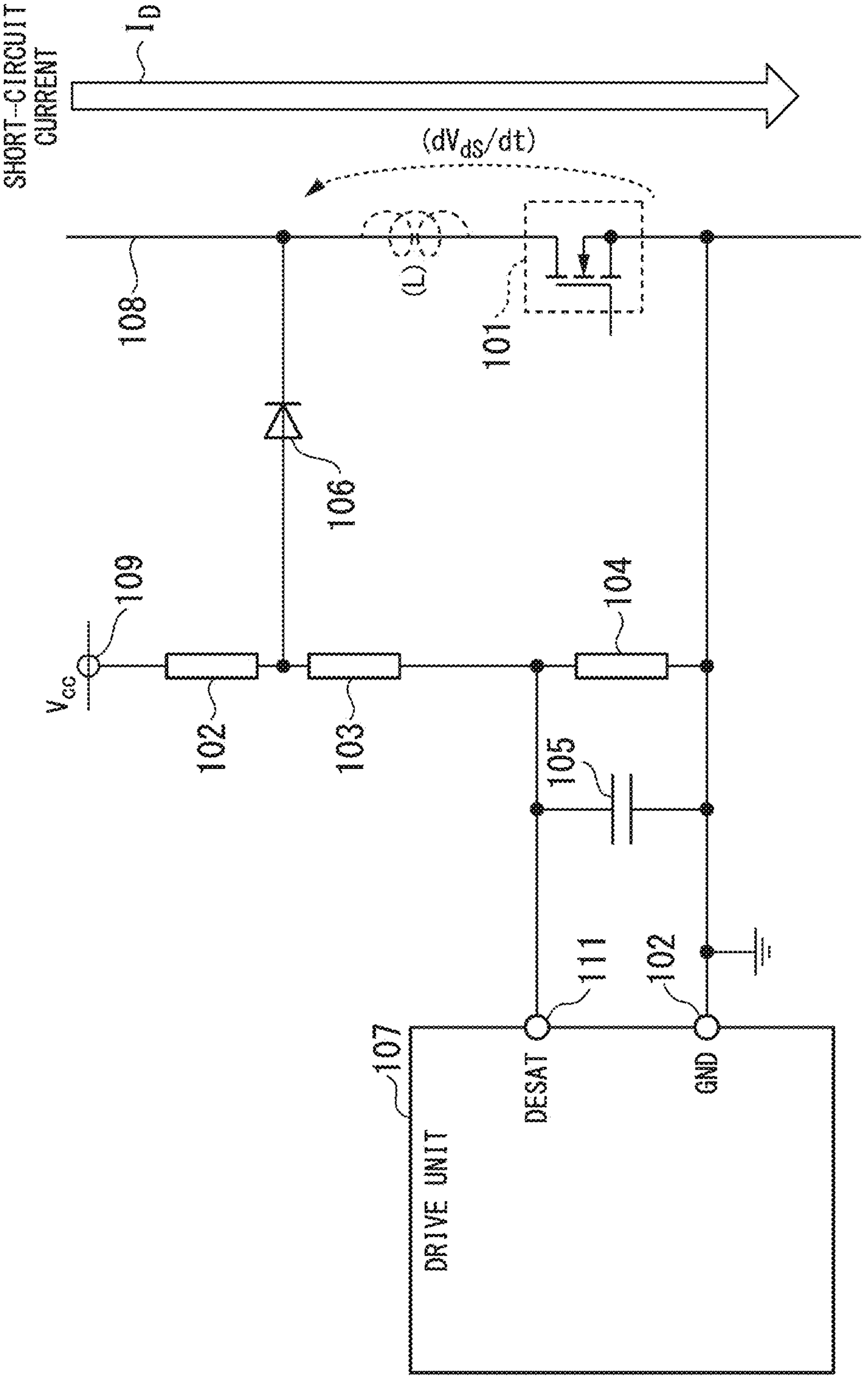
FIG. 9 A diagram for illustrating short-circuit protection of a DESAT type.

Hereinafter, a short-circuit protection circuit, a semiconductor device, and a short-circuit protection method according to embodiments of the present disclosure will be described with reference to FIGS. 1 to 8. FIG. 1 is a circuit diagram showing a configuration example of a semiconductor device according to an embodiment of the present disclosure. FIGS. 2 and 3 are diagrams showing an operation example of the semiconductor device according to the embodiment of the present disclosure in a normal state. FIG. 4 is a diagram showing an operation example of the semiconductor device according to the embodiment of the present disclosure in a case in which a short-circuit current flows. FIG. 5 is a diagram showing an operation example of the semiconductor device according to the embodiment of the present disclosure in a transitional period in a case in which a short-circuit current flows. FIG. 6 is a diagram showing a change in a DESAT voltage for different stray capacitances calculated by computer simulation according to an embodiment of the present disclosure. FIG. 7 is a diagram showing a path of a current caused by a capacitor element in a transitional period of the semiconductor device according to the embodiment of the present disclosure in a case in which a short-circuit current flows. FIG. 8 is a diagram illustrating a stray capacitance in a typical semiconductor diode. The same or corresponding components in each figure are designated by the same reference signs and their explanations are omitted as appropriate.

FIG. 1 is a circuit diagram showing a configuration example of a semiconductor device 1 according to an embodiment of the present disclosure. The semiconductor device 1 is a device that is applied to, for example, a power converter or an inverter. In a case in which the semiconductor device 1 is applied to an inverter, a semiconductor switch element 11 provided in the semiconductor device 1 corresponds to one arm of the inverter. The semiconductor device 1 includes the semiconductor switch element 11, a voltage dividing circuit 12, a power supply 13, a semiconductor rectifying element 14, an RC (resistor capacitor) parallel circuit 15, a drive unit 16, and a resistance element 17.

The semiconductor switch element 11 is a circuit element to be protected from a short-circuit current and is, for example, a high-speed switching power semiconductor such as SiC. FIG. 1 shows an N-channel enhancement type MOSFET as an example. In the semiconductor switch element 11, a drain terminal is a current-inflow-side terminal and is connected to a conductive wire 61. A source terminal is a current-outflow-side terminal and is connected to a conductive wire 62. A gate terminal is a terminal to which a voltage is applied to turn on the semiconductor switch element 11 and is connected to an OUT terminal 54 of the drive unit 16 via the resistance element 17 which is a so-called gate resistor.

The voltage dividing circuit 12 includes a resistance element 21 and a resistance element 22 connected in series. One end of the voltage dividing circuit 12, more specifically, one end of the resistance element 21, is connected to the power supply 13. The voltage dividing circuit 12 divides a power supply voltage having a voltage value of VCC supplied from the power supply 13. Hereinafter, the resistance value of the resistance element 21 is indicated as R1, and the resistance value of the resistance element 22 is indicated as R2.

The semiconductor rectifying element 14 is, for example, a semiconductor diode, and an anode side thereof is connected to a connection point 66 between the resistance element 21 and the resistance element 22 of the voltage dividing circuit 12, and a cathode side thereof is connected to the conductive wire 61 at a connection point 65 present on a path of the conductive wire 61.

The RC parallel circuit 15 includes a capacitor element 31 and a resistance element 32 connected in parallel. Here, the capacitor element 31 is, for example, a blanking capacitor that is an external component of a DESAT circuit. One end of the RC parallel circuit 15, more specifically, one end of each of the capacitor element 31 and the resistance element 32, is connected to the resistance element 22 which is the other end of the voltage dividing circuit 12 and to a DESAT terminal 52 of the drive unit 16. The other end of the RC parallel circuit 15, more specifically, the other end of each of the capacitor element 31 and the resistance element 32, is connected to the conductive wire 62. Hereinafter, the electrostatic capacitance of the capacitor element 31 is indicated as C1, and the resistance value of the resistance element 32 is indicated as R3.

The drive unit 16 is, for example, a gate drive circuit incorporating a short-circuit protection circuit of a DESAT type, and includes a drive processing unit 41, semiconductor diodes 42 and 43, a switch 44, an IN terminal 51, a DESAT terminal 52, a GND terminal 53, and an OUT terminal 54. In the semiconductor diode 42, an anode side is connected to the DESAT terminal 52 and a cathode side is connected to the IN terminal 51. In the semiconductor diode 43, an anode side is connected to the GND terminal 53 and a cathode side is connected to the DESAT terminal 52. The switch 44 is connected to the DESAT terminal 52 and the GND terminal 53. The IN terminal 51 is connected to the power supply 13. The GND terminal 53 is connected to the conductive wire 62. The conductive wire 62 is connected to the GND of the power supply 13.

The drive processing unit 41 is, for example, a gate driver IC (integrated circuit). When the drive processing unit 41 applies a voltage to the OUT terminal 54, the voltage is applied to the gate terminal of the semiconductor switch element 11 via the resistance element 17. When a voltage is applied to the gate terminal, the semiconductor switch element 11 is turned on, and electrical continuity is established between the drain terminal and the source terminal. In response to this, the drive processing unit 41 stops application of a voltage to the OUT terminal 54, whereby the semiconductor switch element 11 is turned off, and the electrical continuity between the drain terminal and the source terminal is interrupted. In a case in which no voltage is applied to the OUT terminal 54, the drive processing unit 41 makes the switch 44 into a connected state. In this case, the DESAT terminal 52 and the GND terminal 53 are short-circuited via the switch 44. In a case in which a voltage is applied to the OUT terminal 54, the drive processing unit 41 makes the switch 44 into an opened state. In this case, the DESAT terminal 52 and the GND terminal 53 are not short-circuited via the switch 44.

When the voltage detected at the DESAT terminal 52 becomes equal to or higher than a predetermined threshold value, the drive processing unit 41 performs short-circuit protection processing by stopping application of a voltage to the OUT terminal 54 to turn off the semiconductor switch element 11.

(Example of Operation of Semiconductor Device in Normal State)

An operation of the semiconductor device 1 in a normal state will be described with reference to FIGS. 2 and 3. Here, the normal state refers to a state in which the current value of the current flowing through the conductive wire 61 satisfies the rated current value. FIG. 2 shows a state in which the drive processing unit 41 of the drive unit 16 applies no voltage to the OUT terminal 54 and the semiconductor switch element 11 is turned off. In a case in which no voltage is applied to the OUT terminal 54, the drive processing unit 41 makes the switch 44 into a connected state, and thus the DESAT terminal 52 and the GND terminal 53 are short-circuited via the switch 44. In this case, the current supplied from the power supply 13 via the voltage dividing circuit 12 flows out to the conductive wire 62 connected to the GND of the power supply 13 via the DESAT terminal 52, the switch 44, and the GND terminal 53. Therefore, the capacitor element 31 of the RC parallel circuit 15 is not charged and the voltage at the DESAT terminal 52 becomes "0 V," and thus the drive processing unit 41 does not perform short-circuit protection processing.

FIG. 3 shows a state in which the drive processing unit 41 of the drive unit 16 applies a voltage to the OUT terminal 54 and the semiconductor switch element 11 is turned on. In a case in which a voltage is applied to the OUT terminal 54, the drive processing unit 41 makes the switch 44 into the opened state, and thus the DESAT terminal 52 and the GND terminal 53 are not short-circuited via the switch 44. When the semiconductor switch element 11 is turned on, a current Id having a current value that satisfies the rated current value is supplied to the conductive wire 61. The current Id flows between the drain terminal and the source terminal of the semiconductor switch element 11, and as a result, a DS voltage Vds of less than a few volts is generated at the connection point 65. The resistance value R1 of the resistance element 21 and the resistance value R2 of the resistance element 22 of the voltage dividing circuit 12 are designed such that the voltage at the connection point 66 which is generated by dividing the power supply voltage VCC of the power supply 13 is higher than the DS voltage Vds generated when the current Id flows. For this reason, the current IA supplied from the power supply 13 flows to the semiconductor switch element 11 via the semiconductor rectifying element 14 and the conductive wire 61.

Incidentally, when a voltage is applied to the gate terminal of the semiconductor switch element 11, the current Id does not immediately flow between the drain terminal and the source terminal, but rather there is a transitional period from when the current Id starts to flow between the drain terminal and the source terminal until the state shown in FIG. 3 is reached. During this transitional period, the switch 44 is in the opened state and the voltage at the connection point 65 is higher than the voltage at the connection point 66. For this reason, the capacitor element 31 is supplied with a current from the power supply 13 via the voltage dividing circuit 12 and is charged. However, the resistance value R1 of the resistance element 21, the resistance value R2 of the resistance element 22, the resistance value R3 of the resistance element 32, and the electrostatic capacitance C1 of the capacitor element 31 are designed in advance such that the voltage at the DESAT terminal 52 is less than the threshold value even if the capacitor element 31 is charged during this transitional period. For this reason, in an operation in the normal state, including during a transitional period, the drive processing unit 41 does not perform the short-circuit protection processing.

(Example of Operation of Semiconductor Device in a Case in which Short-Circuit Current Flows)

Referring to FIGS. 4 and 5, the operation of the semiconductor device 1 in a case in which a short-circuit current flows will be described, and a mechanism by which a DESAT voltage VDESAT, which will be described with reference to FIG. 10, decreases in a section indicated by a reference sign 212 will be described.

For example, it is assumed that the semiconductor switch element 11 of the semiconductor device 1 is applied as a lower arm of an inverter. In addition, it is assumed that a semiconductor switch element of an upper arm (not shown) is connected to the conductive wire 61, and that the semiconductor switch element is in a faulty state, causing a short circuit between the drain terminal and the source terminal. In this case, when the drive processing unit 41 applies a voltage to the OUT terminal 54, the semiconductor switch element 11 is turned on, and the short-circuit current ID starts to flow through the conductive wire 61.

The magnitude of the short-circuit current ID is several times or about ten times the magnitude of the current Id flowing through the conductive wire 61 in the case of the normal state. The DS voltage Vds of the semiconductor switch element 11 increases as the current value of the current flowing between the drain terminal and the source terminal increases. For this reason, in a case in which the short-circuit current ID flows through the conductive wire 61, the DS voltage Vds of the semiconductor switch element 11 becomes larger than that in a case in which the current Id in the normal state flows through the conductive wire 61. The voltage dividing circuit 12 and the RC parallel circuit 15 are designed in advance such that, in a case in which the short-circuit current ID flows through the conductive wire 61, the voltage at the connection point 65 is higher than the voltage at the connection point 66. Therefore, in a case in which the short-circuit current ID flows through the conductive wire 61, the current IA supplied from the power supply 13 via the resistance element 21 does not flow through the semiconductor rectifying element 14, but flows through the RC parallel circuit 15 via the resistance element 22.

When the current IA supplied to the RC parallel circuit 15 is supplied to the capacitor element 31, the capacitor element 31 is charged and the voltage at the DESAT terminal 52 increases. When the voltage at the DESAT terminal 52 becomes equal to or higher than the threshold value, the drive processing unit 41 stops application of a voltage to the OUT terminal 54 to turn off the semiconductor switch element 11. As a result, the semiconductor switch element 11 is protected from the short-circuit current ID.

FIG. 5 is a diagram showing the state of the semiconductor device 1 in a transitional period from when the semiconductor switch element 11 is turned on and the short-circuit current ID starts to flow through the conductive wire 61 until the state shown in FIG. 4 is reached. Even when the semiconductor switch element 11 is turned on, the short-circuit current ID does not immediately flow between the drain terminal and the source terminal. For this reason, the DS voltage Vds of the semiconductor switch element 11 is maintained at the DS voltage Vds in a case in which the semiconductor switch element 11 is turned off, that is, at a DC voltage. As the short-circuit current ID increases, a voltage drop of L dID/dt occurs due to a parasitic inductance component L present in the conductive wire 61 between the connection point 65 and the drain terminal of the semiconductor switch element 11. For this reason, the DS voltage Vds decreases in the section indicated by a reference sign 211 as shown in a graph 202 of FIG. 10.

When the DS voltage Vds decreases, the voltage between the connection point 65 and the connection point 66, that is, the voltage across the semiconductor rectifying element 14, also changes. This voltage change is designated as dVds/dt. In this case, in the semiconductor rectifying element 14, a current having a current value of Cd1·dVds/dt according to a stray capacitance Cd1 of the semiconductor rectifying element 14 flows from the anode side to the cathode side. In FIG. 5, a direction in which the current flows can be shown as a current IB indicated by a dashed arrow. However, the current IB also includes the current generated in the capacitor element 31 in response to the voltage change of dVds/dt, and therefore the current value of the current IB does not match Cd1·dVds/dt, which is the current value of the current generated in semiconductor rectifying element 14.

Therefore, as shown in FIG. 5, the capacitor element 31 is supplied with the current IA supplied from the power supply 13 via the voltage dividing circuit 12 and the current IB flowing in a direction opposite to a direction of the current IA. Here, in a case in which the current value of the current IA is represented as IA and the current value of the current IB is represented as IB, when IA<IB, the terminal of the capacitor element 31 on a side connected to the conductive wire 62 becomes a positive electrode and is charged. For this reason, a phenomenon in which the voltage at the DESAT terminal 52 decreases in the section indicated by the reference sign 212 in FIG. 10 occurs.

(Conditions for Stray Capacitance Cd1 of Semiconductor Rectifying Element)

Figure 10:
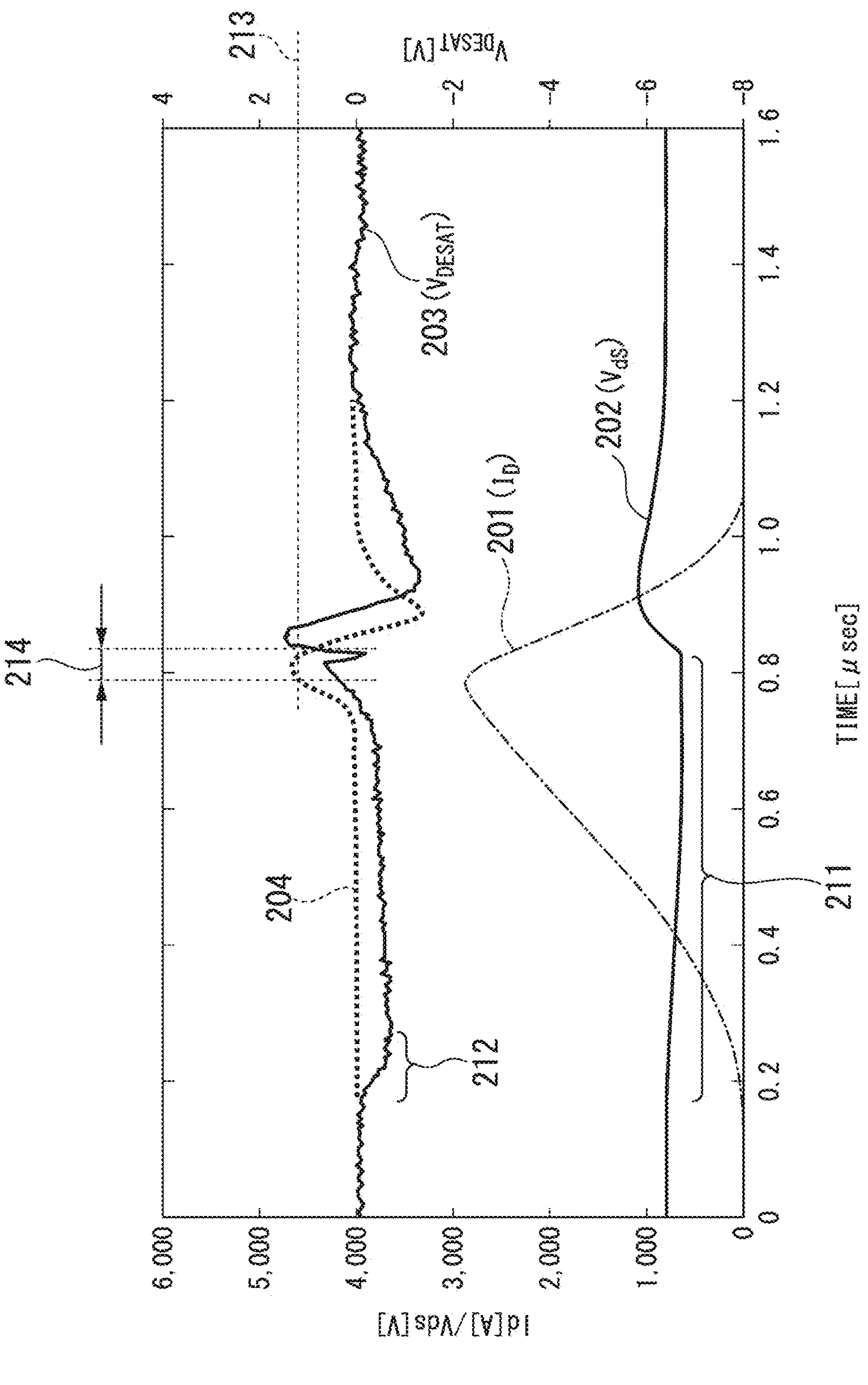
FIG. 10 A diagram showing a change in a short-circuit current, a DESAT voltage, and a DS voltage when short-circuit protection of a DESAT type is performed.

In order to prevent the phenomenon in which the voltage at the DESAT terminal 52 decreases in the section indicated by the reference sign 212 in FIG. 10 from occurring, it is necessary that IA>IB be maintained at all times during the transitional period from when the short-circuit current ID starts to flow until the state shown in FIG. 4 is reached.

FIG. 6 is a graph generated by computer simulation of a change in the DESAT voltage VDESAT in a case in which each of the semiconductor rectifying elements 14 having five types of stray capacitance Cd1 is applied to the semiconductor device 1 under predetermined simulation conditions and the short-circuit current ID is caused to flow through the conductive wire 61. Here, the predetermined simulation conditions are VCC=17 V, R1=4.7 kΩ, R2=130 kΩ, C1=10 pF, and dVds/dt=400 V/usec.

In FIG. 6, the horizontal axis is a time axis showing elapsed time, and the unit is [μsec]. The vertical axis is an axis showing the magnitude of the DESAT voltage VDESAT, and the unit is [V]. A graph 81 is a graph showing the change in the DESAT voltage VDESAT in a case in which the semiconductor rectifying element 14 having a stray capacitance Cd1 of "0.1 pF" is applied. A graph 82 is a graph showing the change in the DESAT voltage VDESAT in a case in which the semiconductor rectifying element 14 having a stray capacitance Cd1 of "5.1 pF" is applied. A graph 83 is a graph showing the change in the DESAT voltage VDESAT in a case in which the semiconductor rectifying element 14 having a stray capacitance Cd1 of "10.1 pF" is applied. A graph 84 is a graph showing the change in the DESAT voltage VDESAT in a case in which the semiconductor rectifying element 14 having a stray capacitance Cd1 of "20.1 pF" is applied.

A graph 85 is a graph showing the change in the DESAT voltage VDESAT in a case in which the semiconductor rectifying element 14 in which the stray capacitance Cd1 is set to a value sufficiently larger than "20.1 pF" is applied, and in this case, the DESAT voltage VDESAT is clamped by the forward voltage of the semiconductor diode 43 of the drive unit 16. That is, the DESAT voltage VDESAT does not become equal to or lower than the forward voltage of the semiconductor diode 43, but maintains a value consistent with the forward voltage of the semiconductor diode 43 in the section of about 0.75 to 1.25 psec. As can be seen from the graph in FIG. 6, by setting the stray capacitance Cd1 of the semiconductor rectifying element 14 to a value between "0.1 pF" and "5.1 pF," for example, even if the short-circuit current ID flows through the conductive wire 61, the DESAT voltage VDESAT does not become equal to or lower than 0 V, and the state IA>IB can be maintained.

(Conditions for Stray Capacitance Cd1)

With reference to FIG. 7, the conditions for the stray capacitance Cd1 of the semiconductor rectifying element 14 that maintains the state IA>IB even if the short-circuit current ID flows will be described. Here, in order to specify the conditions, a state in which the current values of the current IA and the current IB are maximum is assumed. In FIG. 7, a path for the power supply 13 to ground is supplemented in the circuit configuration of the semiconductor device 1 on the basis of the principle of superposition in electric circuits, and as a result, the power supply 13 can be considered to be connected to the conductive wire 62. In FIG. 7, a path of the current IB can be shown divided into a path through which a current IBC1 involved in charging the capacitor element 31 flows and a path through which a current IBR1 not involved in charging the capacitor element 31 flows. The current IBC1 flows through the path indicated by the dashed and dotted arrows, and the current IBR1 flows through the path indicated by the alternate long and short dash line and dotted arrows. In other words, the path indicated by the dotted arrow is a path where the current IBC1 and the current IBR1 are superimposed on each other. FIG. 7 is a diagram representing a state in which the current values of the currents IA and IB are maximum. The state in which the current values of the current IA and the current IB are maximum is a state in which the current supplied to the RC parallel circuit 15 does not flow through the resistance element 32 and is entirely used to charge the capacitor element 31. For this reason, in FIG. 7, the path of the current IB passing through the resistance element 32 is not shown.

<Regarding Current IA>

The maximum value IAmax of the current IA for charging the capacitor element 31 with a positive voltage is represented by the following expression (1).

[Math. 1]

$$I_{Amax} = \frac{V_{CC}}{(R_1 + R_2)} \quad (1)$$

Here, charging the capacitor element 31 with a positive voltage means charging the capacitor element 31 in a state in which the voltage at the terminal of the capacitor element 31 connected to the DESAT terminal 52 is higher than the voltage at the terminal of the capacitor element 31 connected to the GND terminal 53. In response to this, charging the capacitor element 31 with a negative voltage means charging the capacitor element 31 in a state in which the voltage at the terminal of the capacitor element 31 connected to the DESAT terminal 52 is lower than the voltage at the terminal of the capacitor element 31 connected to the GND terminal 53.

For example, when the numerical values of the above simulation conditions are substituted into expression (1), IAmax≈126 μA.

<Regarding Current IB>

The maximum value IBmax of the current IB for charging the capacitor element 31 with a negative voltage due to the change in the DS voltage Vds, that is, dVds/dt, can be calculated as follows. A combined series capacitance Cc of the stray capacitance Cd1 of the semiconductor rectifying element 14 and the electrostatic capacitance C1 of the capacitor element 31 is expressed by the following expression (2).

[Math. 2]

$$C_c = \frac{1}{\left(\frac{1}{C_1} + \frac{1}{C_{d1}}\right)} \tag{2}$$

Therefore, the maximum value IBmax of the current IB generated due to the voltage change of dVds/dt is represented by the following expression (3).

[Math. 3]

$$I_{Bmax} = C_c \cdot \frac{dV_{ds}}{dt} \tag{3}$$

When IBC1max, which is the maximum value of the current IBC1 involved in the charging of the above-mentioned capacitor element 31, and IBR1max, which is the maximum value of the current IBR1 not involved in the charging of the above-mentioned capacitor element 31, are represented using the maximum value IBmax of the current IB, they can be represented as the following expressions (4) and (5), respectively.

[Math. 4]

$$I_{BC1max} = \frac{I_{Bmax} \cdot R_1}{(R_1 + R_2)} \tag{4}$$

[Math. 5]

$$I_{BR1max} = \frac{I_{Bmax} \cdot R_2}{(R_1 + R_2)} \tag{5}$$

When the numerical values of the above simulation conditions are substituted into expression (4), and further, Cd1=20 pF is substituted thereinto, IBC1 max becomes approximately 90 μA. In addition, when Cd1=4 pF is substituted thereinto, IBC1max becomes approximately 40 μA, and when Cd1=5.1 pF is substituted thereinto, IBC1max becomes approximately 47 μA. As described with reference to FIG. 6, by setting the value of Cd1 to a value between "0.1 pF" and "5.1 pF," even if the short-circuit current ID flows through the conductive wire 61, the DESAT voltage VDESAT will not fall equal to or lower than 0 V, and the capacitor element 31 will be charged with a positive voltage.

As described above, the maximum value IAmax of the current IA calculated by substituting the numerical values of the simulation conditions into expression (1) is about 126 μA. 126 μA is 3.2 times the current value of 40 μA, which is the value of IBC1max in a case in which Cd1=4 pF, and 2.7 times the current value of 47 μA, which is the value of IBC1max in a case in which Cd1=5.1 pF. Therefore, on the basis of the results of the simulation, it is estimated that if the maximum value IAmax of the current IA supplied to the capacitor element 31 is approximately three times the maximum value IBC1max of the current IBC1 supplied to the capacitor element 31 in a direction opposite to that of the current IA, the capacitor element 31 will be charged with a positive voltage.

Therefore, by defining a conditional expression of IAmax×1/3>IBC1max and applying the expressions (1), (3), and (4) to the conditional expression, the following expression (6) is obtained.

[Math. 6]

$$I_{Amax} \cdot \frac{1}{3} = \frac{V_{CC}}{(R_1 + R_2)} \cdot \frac{1}{3} > I_{Bc1max} = \frac{C_c \cdot \frac{dV_{ds}}{dt} \cdot R_1}{(R_1 + R_2)} \tag{6}$$

Since R1+R2>0, expression (6) can be deformed into the following expression (7).

[Math. 7]

$$V_{CC} \cdot \frac{1}{3} > C_c \cdot \frac{dV_{ds}}{dt} \cdot R_1 \tag{7}$$

Since dVds/dt is the gradient of the DS voltage Vds in the section indicated by the reference sign 211 in FIG. 10, the sign is negative. However, as can be seen from the defined conditional expression of IAmax×1/3>IBC1max, the direction of the current is not taken into consideration, and only the magnitude of the current is taken into consideration, and thus dVds/dt can be considered as an absolute value. Therefore, since dVds/dt>0 and R1>0, expression (7) can be deformed into the following expression (8) on the basis of expression (2).

[Math. 8]

$$\frac{V_{CC}}{\left(3 \cdot \frac{dV_{ds}}{dt} \cdot R_1\right)} > C_c = \frac{1}{\left(\frac{1}{C_1} + \frac{1}{C_{d1}}\right)} \tag{8}$$

Since C1>0 and Cd1>0, (1/C1+1/Cd1)>0, and therefore expression (8) can be deformed into the following expression (9).

[Math. 9]

$$\left(\frac{1}{C_1} + \frac{1}{C_{d1}}\right) > \frac{\left(3 \cdot \frac{dV_{ds}}{dt} \cdot R_1\right)}{V_{CC}} \tag{9}$$

In expression (9), by transferring 1/C1 to the right side, the following expression (10) is obtained.

[Math. 10]

$$\frac{1}{C_{d1}} > \frac{\left(3 \cdot \frac{dV_{ds}}{dt} \cdot R_1\right)}{V_{CC}} - \frac{1}{C_1} \tag{10}$$

In a case in which the right side of expression (10) is positive, expression (10) can be deformed into the following expression (11).

[Math. 11]

$$\frac{1}{\left\{\frac{\left(3\cdot\frac{dV_{ds}}{dt}\cdot R_1\right)}{V_{CC}}-\frac{1}{C_1}\right\}}>C_{d1} \tag{11}$$

For example, when the numerical values of the simulation conditions are substituted into expression (11), Cd1<4.313 pF. Cd1<4.313 pF indicates a condition smaller than 5.1 pF, and it is understood that this coincides with the computer simulation shown in FIG. 6.

Therefore, by using the semiconductor device 1 designed to satisfy expression (11), it is possible to satisfy the condition of IA>IB, in other words, the condition that the voltage at one end of the capacitor element 31, which is connected to the voltage dividing circuit 12, is higher than the voltage at the other end of the capacitor element 31, which is connected to the conductive wire 62, when the short-circuit current ID flows through the conductive wire 61. For this reason, even if the short-circuit current ID flows through the conductive wire 61, the DESAT voltage VDESAT does not decrease in the section indicated by the reference sign 212 in FIG. 10, but instead exhibits the change indicated by a reference sign 204 in FIG. 10. As a result, it is possible to protect the semiconductor switch element 11 from the short-circuit current ID at an appropriate timing without increasing the number of semiconductor switch elements 11.

In expression (11), dVds/dt is not a value that directly indicates the value of the circuit element, but as described above, dVds/dt is the voltage drop due to the parasitic inductance component L caused by the short-circuit current ID flowing through the conductive wire 61, that is, L-dID/dt. The change in dVds/dt is a value that can be approximated by a straight line, as shown in the change in the graph 202 in the section indicated by a reference sign 221 in FIG. 10, and this value is a value that can be calculated in advance by simulation or manual calculation.

The parasitic inductance component L of the conductive wire 61 is a value calculated on the basis of the length and diameter of the conductive wire 61 between the connection point 65 and the drain terminal of the semiconductor switch element 11, and is a value that depends on the circuit configuration, and therefore is not a value that can be determined arbitrarily. In addition, dID/dt, which is the rate of change of the short-circuit current ID, is also not a value that can be determined arbitrarily. For this reason, dVds/dt cannot be determined arbitrarily in a circuit design and is a value to be selected from several candidate values. In addition, the power supply voltage VCC of the power supply 13 is a value for which a rated value is generally used. In addition, in a case in which a high-speed switching power semiconductor made of SiC is applied as the semiconductor switch element 11, the electrostatic capacitance C1 of the capacitor element 31 needs to be a capacitance that corresponds to high-speed switching, and therefore is not a value that can be determined arbitrarily. Therefore, in expression (11), the only two values that can be arbitrarily determined are the resistance value R1 of the resistance element 21 and the stray capacitance Cd1 of the semiconductor rectifying element 14.

(Circuit Design Method for Semiconductor Device Satisfying Expression (11))

As a circuit design method for designing the circuit of the semiconductor device 1 to satisfy expression (11), the following two methods are conceivable. A first circuit design method is a method in which values other than the resistance value R1 of the resistance element 21 included in expression (11) are determined in advance, and then the resistance value R1 of the resistance element 21 is adjusted to select a resistance value R1 that satisfies expression (11). As can be seen from expression (11), for example, when the resistance value R1 is decreased, the denominator of the left side of expression (11) also becomes smaller, and therefore the value of the left side of expression (11) becomes larger. For this reason, the allowable range of the value of Cd1 is widened, and the range of options for the semiconductor rectifying element 14 is widened.

That is, the first circuit design method is a method of selecting a resistance element 21 having a resistance value R1 that satisfies the expression (11), and is a method of only replacing the resistance element 21, rather than adding a new component. Therefore, according to the first circuit design method, even if the short-circuit current ID flows through the conductive wire 61, the semiconductor switch element 11 can be protected from the short-circuit current ID at an appropriate timing without delay, without adding a new component. However, when the resistance value R1 is decreased, the current IA increases, and therefore the power consumption of the resistance elements 21, 22, and 32 increases. For this reason, in the first circuit design method, it is necessary to increase the size of the circuit element in order to ensure the rated power. Increasing the size of the circuit element requires that the substrate of the semiconductor device 1 also be made larger, which has the disadvantage of increasing the size of the semiconductor device 1 and decreasing the output density thereof.

A second circuit design method is a method in which values other than the stray capacitance Cd1 of the semiconductor rectifying element 14 included in expression (11) are determined in advance, and the stray capacitance Cd1 is adjusted to select a stray capacitance Cd1 that satisfies expression (11). There are the following two means as a means for adjusting the stray capacitance Cd1. A first means for adjusting the stray capacitance Cd1 is a means for adjusting the size of the area of the PN junction surface of a semiconductor diode in a case in which a semiconductor diode is applied as the semiconductor rectifying element 14. As shown in FIG. 8(*a*), in a case in which a P-type semiconductor 91 and an N-type semiconductor 92 are joined together, a depletion layer 93 is generated between the P-type semiconductor 91 and the N-type semiconductor 92. As shown in FIG. 8(*b*), the depletion layer 93 can be regarded as a capacitor sandwiched between a junction surface 94 of the P-type semiconductor 91 and a junction surface of the N-type semiconductor 92, and the electrostatic capacitance of the capacitor becomes the stray capacitance Cd1. For this reason, the stray capacitance Cd1 is a value calculated on the basis of the following expression (12).

[Math. 12]

$$C_{d1} = \varepsilon \cdot \frac{S}{d} \quad (12)$$

In expression (12), & is the dielectric constant of the depletion layer 93, and dis the length between the junction surfaces 94 and 95. S is the area of the junction surfaces 94 and 95, that is, the so-called chip area. Therefore, for example, in a case in which the stray capacitance Cd1 is to be reduced in order to satisfy the expression (11), the chip area S of the junction surfaces 94 and 95 should be reduced.

That is, a first means of the second first circuit design method is a method of selecting a semiconductor rectifying element 14 having a stray capacitance Cd1 that satisfies the expression (11), and is a method of only replacing the semiconductor rectifying element 14, rather than adding a new component. Therefore, according to the first means of the second circuit design method, even if the short-circuit current ID flows through the conductive wire 61, the semiconductor switch element 11 can be protected from the short-circuit current ID at an appropriate timing without delay, without adding a new component and without the increase in size of the semiconductor device 1 or the decrease in output density thereof, which are the disadvantages of the first circuit design method. However, in the case of a typical semiconductor diode, when the chip area S is reduced, the size of the semiconductor diode also becomes smaller, and thus the inter-terminal distance between the anode terminal and the cathode terminal becomes shorter. For this reason, there is a disadvantage that the insulation distance cannot be ensured and the dielectric withstand voltage of the semiconductor diode decreases.

The second means for adjusting the stray capacitance Cd1 is a means for adjusting the number of semiconductor diodes connected in series in a state in which the semiconductor rectifying element 14 is made up of a plurality of semiconductor diodes connected in series. For example, by connecting n semiconductor diodes having the same stray capacitance in series, the magnitude of the stray capacitance can be reduced to 1/n of that in the case in which one semiconductor diode is used. In this way, in a case in which a plurality of semiconductor diodes connected in series are used as the semiconductor rectifying element 14, it is possible to reduce the stray capacitance Cd1 while maintaining the dielectric withstand voltage of the semiconductor diodes.

That is, according to the second means of the second circuit design method, even if the short-circuit current ID flows through the conductive wire 61, the semiconductor switch element 11 can be protected from the short-circuit current ID at an appropriate timing without delay while overcoming the disadvantage of the first means of the semiconductor switch element of the second circuit design method in that the dielectric withstand voltage of the semiconductor diode is reduced. However, since the semiconductor rectifying element 14 is made up of a plurality of semiconductor diodes connected in series, there is a disadvantage in that the number of components increases.

Other Supplementary Configuration Examples

In the above embodiment, the semiconductor switch element 11 is, for example, an N-channel enhancement type MOSFET. In response to this, an N-channel depletion type MOSFET may be applied as the semiconductor switch element 11. In addition, as the semiconductor switch element 11, a P-channel enhancement type MOSFET or a P-channel depletion type MOSFET may be applied. In addition, as the semiconductor switch element 11, a bipolar transistor such as an IGBT may be applied instead of a MOSFET. The terminal corresponding to each of the above-mentioned "current-inflow-side terminal" and "current-outflow-side terminal" will vary depending on the type of the circuit element applied as the semiconductor switch element 11. For example, in a case in which a P-channel enhancement or depletion type MOSFET is applied as the semiconductor switch element 11, the terminal indicated as the "current-inflow-side terminal" is a source terminal, and the terminal indicated as the "current-outflow-side terminal" is a drain terminal.

In the above embodiment, the voltage dividing circuit 12 includes two resistance elements which are the resistance element 21 and the resistance element 22. In response to this, the voltage dividing circuit 12 may be a voltage dividing circuit including three or more resistance elements. In a case in which the voltage dividing circuit 12 includes three or more resistance elements, the connection point 66 at which the voltage dividing circuit 12 is connected to the semiconductor rectifying element 14 is located somewhere between a plurality of resistance elements included in the voltage dividing circuit 12. In this case, when there are the plurality of resistance elements between the power supply 13 and the connection point 66, the combined resistance value of the plurality of resistance elements becomes the resistance value R1, and the combined resistance value of the remaining resistance elements becomes the resistance value R2.

In the above embodiment, the conductive wire 62 of the semiconductor device 1 is connected to the GND of the power supply 13. In response to this, for example, in a case in which the semiconductor switch element 11 of the semiconductor device 1 is applied to the upper arm of an inverter, a constant voltage is applied to the conductive wire 62, the power supply voltage VCC of the power supply 13 also increases by that constant voltage, and the operating voltage of the semiconductor device 1 increases by that constant voltage.

In the above embodiment, a short-circuit protection circuit that protects the semiconductor switch element 11 from the short-circuit current ID is not explicitly shown. However, for example, in a case in which the semiconductor device 1 is applied to a power converter or an inverter, the following portion corresponds to the short-circuit protection circuit. That is, a portion of the semiconductor device 1 excluding a configuration for processing the power converter or the inverter from the drive processing unit 41, and further excluding the semiconductor switch element 11 and the resistance element 17 from the semiconductor device 1, corresponds to the short-circuit protection circuit that protects the semiconductor switch element 11 from the short-circuit current ID.

In the above, the embodiments of this invention have been described in detail with reference to the drawings, but the specific configuration is not limited to the embodiments, and a design and the like within a range not departing from the gist of this invention are also included.

APPENDIX

The short-circuit protection circuit included in the semiconductor device 1 according to each embodiment can be understood, for example, as follows.

(1) According to a first aspect, there is provided a short-circuit protection circuit including: a voltage dividing circuit 12 that divides a power supply voltage VCC supplied from a power supply 13 connected to one end thereof; a semiconductor rectifying element 14, one end of which is connected between resistance elements 21 and 22 of the voltage dividing circuit 12 and the other end of which is connected onto a path of a conductive wire 61 connected to a current-inflow-side terminal of a semiconductor switch element 11 to be protected, the connection being made such that a direction from the one end to the other end becomes a rectifying direction; an RC parallel circuit 15 connected to the other end of the voltage dividing circuit 12; and a drive unit 16 that turns off the semiconductor switch element 11 when it is detected that a short-circuit current ID flows through the conductive wire 61, on the basis of a voltage of a capacitor element 31 included in the RC parallel circuit 15, in a case in which the semiconductor switch element 11 is turned on, wherein a stray capacitance Cd1 of the semiconductor rectifying element 14 is a stray capacitance Cd1 that satisfies a condition that a voltage at one end of the capacitor element 31 of the RC parallel circuit 15, which is connected to the voltage dividing circuit 12, is higher than a voltage at the other end of the capacitor element 31, when the short-circuit current ID flows through the conductive wire 61. According to the present aspect and the following aspects, it is possible to protect the semiconductor switch element 11 from the short-circuit current ID at an appropriate timing without increasing the number of semiconductor switch elements 11.

(2) A short-circuit protection circuit according to a second aspect is the short-circuit protection circuit of (1), wherein the voltage dividing circuit 12 includes a resistance element 21 of which one end is directly connected to the power supply 13, wherein the one end of the semiconductor rectifying element 14 is connected to the other end of the resistance element 21, and wherein, in a case in which a resistance value of the resistance element 21 is R1, a voltage value of the power supply voltage 13 is VCC, a capacitance of the capacitor element 31 of the RC parallel circuit 15 is C1, a voltage change between the current-inflow-side terminal of the semiconductor switch element 11 and a current-outflow-terminal of the semiconductor switch element 11 is dVds/dt, and the stray capacitance of the semiconductor rectifying element 14 is Cd1, Cd1 satisfies a conditional expression of $1/\{(3\times dVds/dt\times R1)/VCC-1/C1\}>Cd1$.

(3) A short-circuit protection circuit according to a third aspect is the short-circuit protection circuit of (2), wherein, in the conditional expression, variables other than R1 are set to predetermined fixed values, and R1 is adjusted to select R1 that satisfies the conditional expression.

(4) A short-circuit protection circuit according to a fourth aspect is the short-circuit protection circuit of (2), wherein the semiconductor rectifying element 14 is a semiconductor diode, and wherein, in the conditional expression, variables other than Cd1 are set to predetermined fixed values, and an area of a PN junction surface of the semiconductor diode is adjusted to select Cd1 that satisfies the conditional expression.

(5) A short-circuit protection circuit according to a fifth aspect is the short-circuit protection circuit of (2), wherein the semiconductor rectifying element 14 is made up of a plurality of semiconductor diodes connected in series, and in the conditional expression, variables other than Cd1 are set to predetermined fixed values, and the number of the semiconductor diodes connected in series is adjusted to select Cd1 that satisfies the conditional expression.

INDUSTRIAL APPLICABILITY

According to a short-circuit protection circuit, a semiconductor device, and a short-circuit protection method of the present disclosure, it is possible to protect a semiconductor switch element from a short-circuit current at an appropriate timing without increasing the number of semiconductor switch elements.

REFERENCE SIGNS LIST

1 Semiconductor device
11 Semiconductor switch element
12 Voltage dividing circuit
13 Power supply
14 Semiconductor rectifying element
15 RC parallel circuit
16 Drive unit
17, 21, 22, 32 Resistance element
31 Capacitor element
41 Drive processing unit
42, 43 Semiconductor diode
44 Switch
51 IN terminal
52 DESAT terminal
53 GND terminal
54 OUT terminal
61, 62 Conductive wire
65, 66 Connection point

The invention claimed is:

1. A short-circuit protection circuit comprising:

a voltage dividing circuit that divides a power supply voltage supplied from a power supply connected to one end thereof;

a semiconductor rectifying element, one end of which is connected between resistance elements of the voltage dividing circuit and the other end of which is connected onto a path of a conductive wire connected to a current-inflow-side terminal of a semiconductor switch element to be protected, the connection being made such that a direction from the one end to the other end becomes a rectifying direction;

an RC parallel circuit connected to the other end of the voltage dividing circuit; and a drive unit that turns off the semiconductor switch element when it is detected that a short-circuit current flows through the conductive wire, on the basis of a voltage of a capacitor element included in the RC parallel circuit, in a case in which the semiconductor switch element is turned on, wherein the voltage dividing circuit includes a resistance element of which one end is directly connected to the power supply, wherein the one end of the semiconductor rectifying element is connected to the other end of the resistance element, and wherein, in a case in which a resistance value of the resistance element is $R_1$, a voltage value of the power supply voltage is $V_{CC}$, a capacitance of the capacitor element of the RC parallel circuit is $C_1$, a voltage change between the current-inflow-side terminal of the semiconductor switch element and a current-outflow-terminal of the semiconductor switch element is $dV_{ds}/dt$, and the stray capacitance of the semiconductor rectifying element is $C_{d1}$, $C_{d1}$ satisfies a conditional expression of $1/\{(3\times dV_{ds}/dt\times R_1)/V_{CC}-1/C_1\}>C_{d1}$.

2. The short-circuit protection circuit according to claim 1, wherein, in the conditional expression, variables other than $R_1$ are set to predetermined fixed values, and $R_1$ is adjusted to select $R_1$ that satisfies the conditional expression.

3. The short-circuit protection circuit according to claim 1, wherein the semiconductor rectifying element is a semiconductor diode, and wherein, in the conditional expression, variables other than $C_{d1}$ are set to predetermined fixed values, and an area of a PN junction surface of the semiconductor diode is adjusted to select $C_{d1}$ that satisfies the conditional expression.

4. The short-circuit protection circuit according to claim 1, wherein the semiconductor rectifying element is made up of a plurality of semiconductor diodes connected in series, and in the conditional expression, variables other than $C_{d1}$ are set to predetermined fixed values, and the number of the semiconductor diodes connected in series is adjusted to select $C_{d1}$ that satisfies the conditional expression.

5. A semiconductor device comprising:

a semiconductor switch element;

a voltage dividing circuit that divides a power supply voltage supplied from a power supply connected to one end thereof;

a semiconductor rectifying element, one end of which is connected between resistance elements of the voltage dividing circuit and the other end of which is connected onto a path of a conductive wire connected to a current-inflow-side terminal of the semiconductor switch element, the connection being made such that a direction from the one end to the other end becomes a rectifying direction;

an RC parallel circuit connected to the other end of the voltage dividing circuit; and a drive unit that turns off the semiconductor switch element when it is detected that a short-circuit current flows through the conductive wire, on the basis of a voltage of a capacitor element included in the RC parallel circuit, in a case in which the semiconductor switch element is turned on, wherein the voltage dividing circuit includes a resistance element of which one end is directly connected to the power supply, wherein the one end of the semiconductor rectifying element is connected to the other end of the resistance element, and wherein, in a case in which a resistance value of the resistance element is $R_1$, a voltage value of the power supply voltage is $V_{CC}$, a capacitance of the capacitor element of the RC parallel circuit is $C_1$, a voltage change between the current-inflow-side terminal of the semiconductor switch element and a current-outflow-terminal of the semiconductor switch element is $dV_{ds}/dt$, and the stray capacitance of the semiconductor rectifying element is $C_{d1}$, $C_{d1}$ satisfies a conditional expression of $1/\{(3\times dV_{ds}/dt\times R_1)/V_{CC}-1/C_1\}>Cd1$.

6. A short-circuit protection method, wherein a voltage dividing circuit divides a power supply voltage supplied from a power supply connected to one end thereof, wherein a capacitor element included in an RC parallel circuit connected to the other end of the voltage dividing circuit is charged on the basis of a current supplied, wherein, a semiconductor rectifying element in which a direction from one end to the other end becomes a rectifying direction, and in which the one end is connected between resistance elements of the voltage dividing circuit and the other end is connected onto a path of a conductive wire connected to a current-inflow-side terminal of a semiconductor switch element to be protected and which conducts a current in the rectifying direction in a case in which a voltage at the one end thereof is higher than a voltage at the other end thereof, and wherein a drive unit turns off the semiconductor switch element when it is detected that the short-circuit current flows through the conductive wire, on the basis of a voltage of the capacitor element included in the RC parallel circuit, in a case in which the semiconductor switch element is turned on wherein the voltage dividing circuit includes a resistance element of which one end is directly connected to the power supply, wherein the one end of the semiconductor rectifying element is connected to the other end of the resistance element, and wherein, in a case in which a resistance value of the resistance element is $R_1$, a voltage value of the power supply voltage is $V_{CC}$, a capacitance of the capacitor element of the RC parallel circuit is $C_1$, a voltage change between the current-inflow-side terminal of the semiconductor switch element and a current-outflow-terminal of the semiconductor switch element is $dV_{ds}/dt$, and the stray capacitance of the semiconductor rectifying element is Cd1, $C_{d1}$ satisfies a conditional expression of $1/\{(3\times dV_{ds}/dt\times R_1)/V_{CC}-1/C_1\}>C_{d1}$.

* * * * *